REEL WITH TAPE GUIDE

Filed April 11, 1966

PRIOR ART PRIOR ART

INVENTORS
ANTHONY L. GELARDI
CHARLES T. CONWAY
BY Wolf, Greenfield & Hieken
ATTORNEYS Sept. 19, 1967 A. L. GELARDI ETAL 3,342,435

REEL WITH TAPE GUIDE

Filed April 11, 1966

3 Sheets-Sheet 2

INVENTORS
ANTHONY L. GELARDI
CHARLES T. CONWAY
BY Wolf, Greenfield & Hieken
ATTORNEYS INVENTORS
ANTHONY L. GELARDI
CHARLES T. CONWAY
BY Wolf, Greenfield & Hieken
ATTORNEYS United States Patent Office 3,342,435
Patented Sept. 19, 1967

3,342,435
REEL WITH TAPE GUIDE

Anthony L. Gelardi, Cranston, R.I., and Charles T. Conway, South Boston, Mass., assignors to Data Packaging Corporation, Cambridge, Mass., a corporation of Massachusetts Filed Apr. 11, 1966, Ser. No. 541,788
10 Claims. (Cl. 242—71.8)

ABSTRACT OF THE DISCLOSURE

A tape reel having a tape guide disposed between the reel flanges and movable to an operative condition in response to a phase of the winding operation of the tape on the reel.

This invention relates to reels and more particularly comprises a new and improved magnetic tape reel for insuring even winding of the tape on the reel.

Improved manufacturing techniques and new reel developments such as is shown in Patent No. 3,229,928 entitled, Reel, and dated Jan. 18, 1966, have made possible the provision of true winding surfaces on reel hubs so that successive turns of tape wound on the hubs of reels may be precisely aligned with one another. Normally, limited clearance is provided between the reel flanges in excess of the tape width, and the tape winds against the inner surface of one flange. In such cases, if the tape is wound perfectly, each successive turn engages that flange and the turns are uniformly spaced from the opposite flange of the reel. Occasionally, a single or a few turns of tape displace from the otherwise even stack of turns so that one or a few edges extends beyond the other edges toward the other reel flange. Uneven winding of the type described may result from one or several causes, but most commonly it occurs because of imperfections in the tape itself. Some other causes are changes in the speed of the machine upon which the reel is mounted, improper machine alignment, vibration in the reel or machine and extraneous air currents.

Because the flanges of tape reels are flexible, the edge of a turn of tape that extends beyond the other edges is subject to damage when the reel flange is flexed and pressed against the exposed tape edge. It is evident that when the edge is damaged some of the information stored on the tape may be destroyed, and this may destroy the usefulness of the entire tape.

One common tape width is .500″, and ordinarily a gap of between approximately .525″ and .565″ is provided between the inner surfaces of the reel flanges. Although all of the resulting clearance of between .025″ and .065″ ordinarily is provided on one side of the tape because the tape engages one flange, it is nevertheless insufficient to insure the protection of the edges of tape turns which are displaced from the others because of uneven winding.

The non-aligned turns of tape on the reel are referred to in the industry as blow-outs, and throughout the remainder of this application that term will be used.

One important object of this invention is to provide means for preventing blow-outs in the winding of tape on reels.

Another important object of this invention is to provide a guide which will not itself damage the tape edges for directing turns of tape into the desired position on a reel.

Yet another important object of this invention is to provide an inexpensive device on the flange or flanges of a reel which will prevent tape blow-outs.

To accomplish these and other objects and features of this invention, this invention includes a reel having a hub and a pair of substantially parallel flanges. A guide or pillow is disposed on the inner surface of at least one of the flanges. The guide or pillow is positioned to engage each turn of tape as it is deposited on the reel and selectively position the tape turn with respect to all of the preceding turns wound on the hub.

These and other objects and features of this invention along with its incident advantages will be better understood and appreciated from the following detailed description of several embodiments thereof, selected for purposes of illustration and shown in the accompanying drawing, in which.

Figures 1, 2, 3:
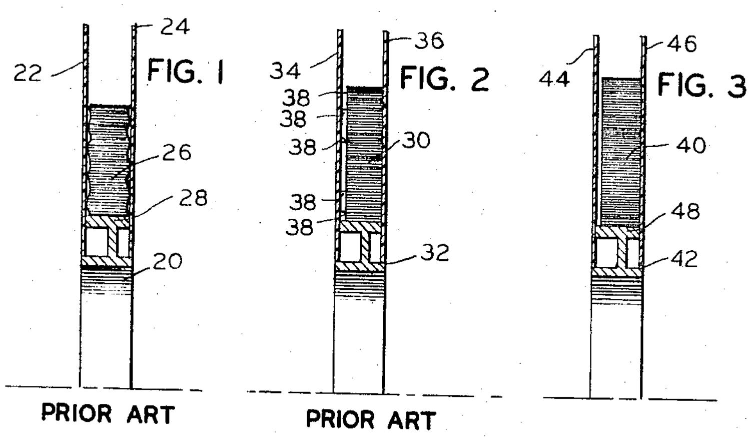
FIG. 1 is a fragmentary cross-sectional view of a reel illustrating the manner in which tape is sometimes wound on prior art devices.
FIG. 2 is a fragmentary cross-sectional view of a prior art reel showing several blow-outs in the tape wound upon it.
FIG. 3 is a fragmentary cross-sectional view illustrating perfectly wound tape upon a reel.

FIGS. 1 and 2 show prior art devices with tape wound on them. The reel of FIG. 1, which includes a hub 20 and reel flanges 22 and 24, carries tape 26 irregularly wound between the flanges. The irregularity of the tape 26 wound on the hub 20 of the reel suggests that the winding surface 28 of the hub is not parallel throughout its circumference to the axis of rotation of the reel. This type of winding is common in a number of inexpensive prior art tape reels. It is evident from an inspection of FIG. 1 that the tape migrates from one reel flange to the other. There may be exposed tape edges from blow-outs which are subject to damage when the flanges 22 and/or 24 are flexed. There are, of course, other disadvantages incident to the uneven winding of tape in the manner shown in FIG. 1. For example, when tape is wound unevenly on a reel in the manner shown in FIG. 1, it may cause the reel to vibrate during rapid winding or unwinding and cause the tape to rub against the reel flanges.

The reel shown in FIG. 2 is somewhat typical of the more sophisticated reels in the prior art. It will be noted in FIG. 2 that the great majority of turns of tape 30 wound on the hub 32 between the flanges 34 and 36 are uniform and engage the inner surface of the flange 36. Thus, the opposite edges of each of the turns are spaced from the inner surface of the flange 34. If all of the edges adjacent the flange 34 were spaced the same distance from that flange, they would not be vulnerable as they would together define a flat solid wall against which the flange 34 could bend without damaging the tape edges. However, this improved reel is not immune from blow-outs, and several blow-outs 38 are shown wherein the edges of those turns are displaced from the otherwise even, solid tape mass. It is evident that if the flange 34 is flexed against the exposed edges of the blow-outs, those edges will be damaged. If bits of information are stored on those edges the value of the tape will either be seriously impaired or destroyed.

FIG. 3 diagrammatically illustrates what is achieved by the present invention. In this figure, the tape 40 wound on the hub 42 of the reel between the flanges 44 and 46 is perfectly uniform from the winding surface 48 of the hub to the outermost turn of the tape. There are no exposed edges caused by blowouts which may be damaged when the reel flange 44 is flexed toward the outer flange 46.

FIGS. 4–7 illustrate a preferred embodiment of the present invention for achieving the results shown in FIG. 3. The invention is embodied in a reel of the type shown in Patent No. 3,229,928, supra, but it is to be expressly understood that the invention may be embodied in reels of very different construction.

The reel of FIGS. 4–7 includes a hub 50 generally in the shape of an I-beam in cross-section having an inner hub flange 52 which fits on the spindle of a machine that uses the reel, and a winding hub flange 54 that has a true surface 56 upon which the tape is actually wound. A pair of reel flanges 58 and 60 carry spaced tongues 62 and 64, respectively, that are secured together through slots 66 provided in the web 68 of the hub 50. The flanges 58 and 60 are hereinafter referred to as the tape guide flange and the front flange, respectively.

Figures 4, 6:
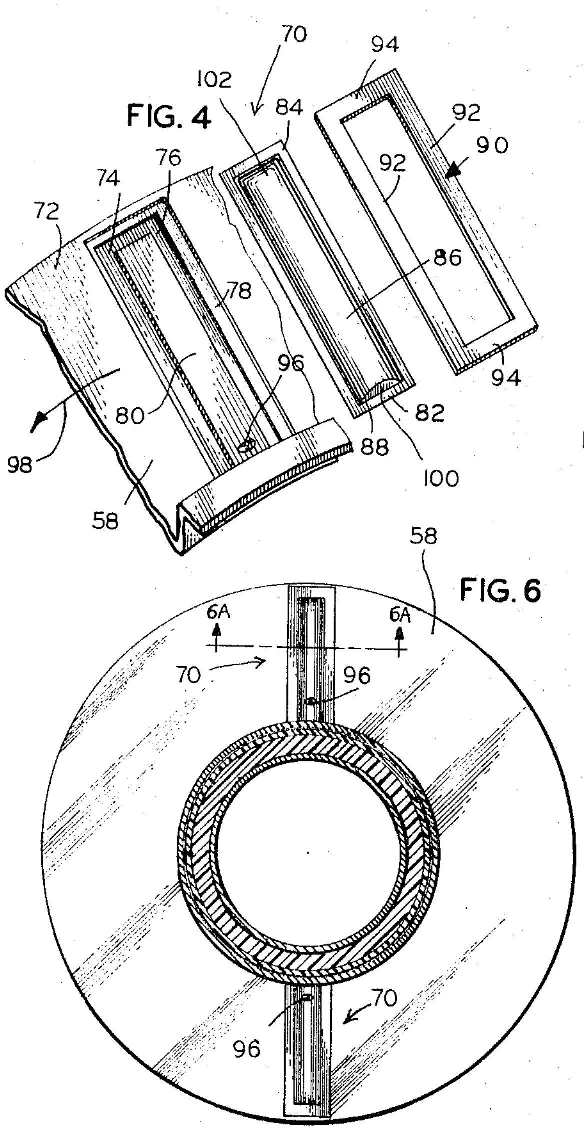
FIG. 4 is an exploded fragmentary perspective view of an improved reel for magnetic tape constructed in accordance with this invention.
FIGS. 6 and 6A are cross-sectional views taken along the section lines 6—6 and 6A—6A of FIG. 5.

The tape guide flange 58 is shown in FIG. 6 to carry a pair of guides 70 which are identical. In FIG. 4 one of the guides is shown in exploded form as part of the tape guide flange 58.

In FIG. 4, the inner surface 72 of the tape guide flange 58 is shown provided with a generally rectangular well 74. The well includes a shallow inner depression 76 and a step or shoulder 78 about its edge. Typically, the total depth of the well 74 measured at the depression 76 may be approximately .045″, and the depth of the shoulder 78 may be .040″. Seated in the central depression 76 is a flat strip 80 having a thickness substantially equal to the total depth of the well 74. Typically, the strip may have a thickness of .042″.

A pillow is formed over the well 74 by a thin strip of film material 84 which serves as a guide, having a central portion in the shape of an inverted trough 86 and a surrounding flange 88. The over-all plan dimensions of the film strip 84 are just under the dimensions of the central depression 76 in the well 74, and consequently, the flange 88 sits within the inner edge of the shoulder 78 in the well. The thickness of the film may be approximately .002″, and it is an extremely flexible and soft material which will not mutilate the tape when the tape is drawn across it as the tape is wound on the reel hub. Further, the film must possess sufficient strength so as not to tear with the constant friction of the tape being drawn across it. This will be described in greater detail below.

Figures 5, 7:
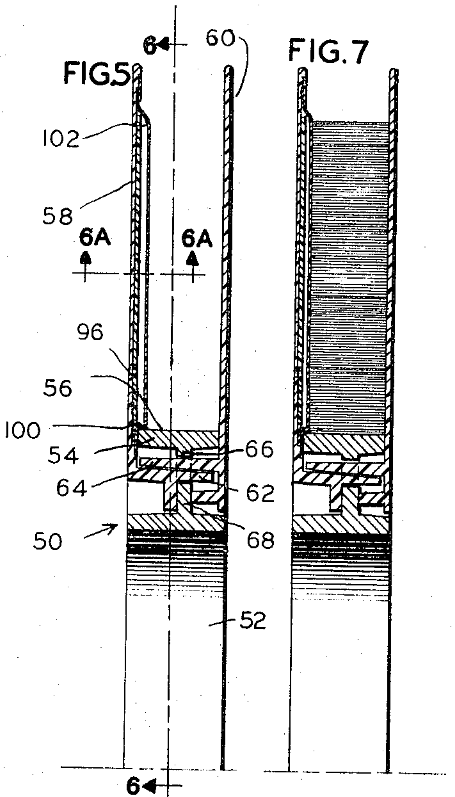
FIG. 5 is a fragmentary cross-sectional view of a reel including the components shown in FIG. 4.
FIG. 7 is a view similar to that of FIG. 5 but showing tape wound upon the reel.
Figure 6A:
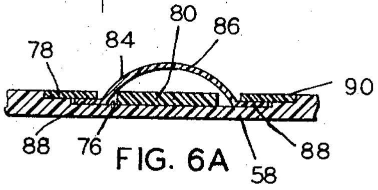

The total thickness of the pillow measured from the top of the trough to the opposite side of the shoulder or flange 88 may be approximately .075″ at the inner end adjacent the hub 50 and approximately .100″ at its outer end near the reel periphery, so that it extends above the surface 72 of the guide flange 58 of the reel, approximately .030″. This taper substantially conforms to the taper or flare between the flanges of the reel, so that the pillow may provide some interference between its outer surface and the adjacent edge of the tape throughout its length when the tape is wound on the hub as shown in FIG. 7. This taper may be between .525″ at the hub and .565″ at the periphery. Ideally, this interference is approximately .008″, and therefore the pillow is somewhat compressed as the tape is wound upon the reel.

The pillow strip 84 is retained in place in the depression of the well 74 on the surface 72 of the tape guide flange 58 by frame 90 which is designed to sit on the shoulder 78 of the well 74. The sides 92 and ends 94 of the frame in the embodiment shown may be approximately .200″ or approximately twice the width of the shoulder 78 so that the sides extend inwardly from the inner edge of the shoulders above the central depression 76 to overlap the flange 88 of the pillow strip 84. That is, the width of the sides 92 and ends 94 of the frame are substantially equal to the total width of the shoulder 78 and the underlying flange 88. The frame 90 may have a thickness of approximately .040″ so that its upper surface is exactly flush with the inner surface 72 of the tape guide flange 58 of the reel when the frame is seated on shoulder 78. The frame 90 may be sonically welded to the shoulder 78 in the well, but the film strip 84 is generally free to shift slightly in the depression, as its flange 88 is merely sandwiched between the lower surface of the depression and the inner portions of the frame sides and ends.

The pillow strip 84 is slightly narrower than the depression 76 so that when the trough flattens, the sides of the strip may spread out a bit. The strip 80 disposed in the bottom of the depression 76 prevents the trough 86 from inverting or bowing inwardly so as to permanently deform in the wrong direction. It is evident that some means must be provided to prevent the pillow from permanently collapsing into the well out of reach of the tape so that it no longer can function to guide the tape into position.

An opening 96 in the tape guide flange 58 at the bottom of the well depression 76 adjacent the hub 50 also extends through the strip 80 in the well depression, and the opening is inclined so as to serve as an air scoop when the real is rotating to maintain the pillow 82 in the shape shown in FIG. 5. The flexible nature of the film allows air scooped by the opening 96 to sustain the trough configuration so that it regularly maintains its shape. The inclination of the opening 96 suggests that the reel rotates in the direction of arrow 98 (FIG. 4) when tape is being wound on the reel. It is not necessary for the pillow 82 to return to its fully extended position. It will perform its intended function as long as it is not spaced from the front flange 60 a distance greater than the tape width. Thus, although the pillow may take a permanent set when pressed by the tape, it will still serve its function.

The inner end of the trough 86 lies immediately adjacent the winding surface 56 on hub flange 54. The lower or inner end of the trough is shown in FIG. 4 to be somewhat flat at 100, and it may abut against the surface 56 or even lie beneath it toward the reel center. The outer end 102 of the trough is rounded as is evident in FIGS. 5 and 7 so that it does not present a sharp edge which could cause the tape edge to tear or otherwise become mutilated.

FIG. 7 shows how the pillow functions to cause the tape to wind perfectly on the hub. It will be noted in FIG. 7 that the tape guide 70 abuts against the adjacent edge of each turn of tape wound on the reel. As the reel rotates on its spindle and the tape threads between the flanges, the pillow serves to push each turn of tape against the front flange 60 of the reel and prevents displacement of each turn away from the front flange. The pillow also serves as an automatic tape threading device to hold the first turn of tape on the hub. The operator may merely place the leading edge of tape between the flanges of the reel, and rotation of the reel causes the leading end to ride to the surface 56. The interference between the pillow and the tape edge serves to hold the leading end of the tape on the hub and prevent it from slipping.

Figure 8:
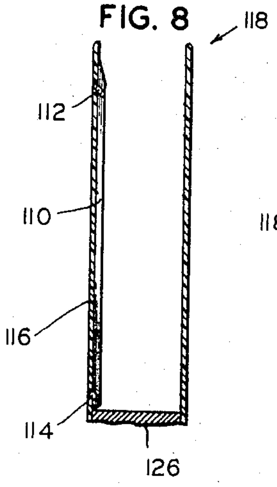
FIG. 8 is a fragmentary cross-sectional view of another embodiment of this invention.
Figure 9:
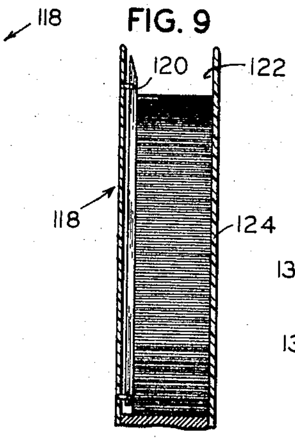
FIG. 9 is a view similar to FIG. 8 but showing tape wound on the reel.

In FIGS. 8–16 several additional embodiments of this invention are shown. Each is intended to cause the tape to wind evenly on the hub of the reel and prevent blow-outs. In the embodiments of FIGS. 8 and 9, a bar 110 is shown carried by a pair of pivot pins 112 and 114 on the inner surface of the tape guide flange 116 of reel 118. The bar 110 at rest lies flush against the inner surface of the tape guide flange 116 of the reel and serves no particular purpose. However, when the reel is rotated about its axis on the machine spindle (not shown), the bar 116 under the influence of centrifugal force shifts to the position shown in FIG. 9. When the bar is extended to that position, its inner edge 120 forms a guide to cause each turn of tape to wind against the inner surface 122 of the front flange 124 of the reel. Because the strip when the reel is at rest is in the retracted position shown in FIG. 8, it does not interfer with the initial placement of the leading end of the tape on the hub 126. After the operator winds a few initial turns of tape on the hub 126, he may then rely upon the bar 110 shifting into position upon rotation of the spindle so as to automatically guide all the additional turns of tape against the surface 122 of the front flange 124. The bar may deflect somewhat as each turn passes over it.

Figure 10:
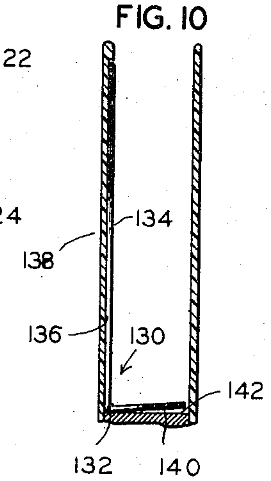
FIG. 10 is a fragmentary cross-sectional view of another embodiment of this invention.
Figure 11:
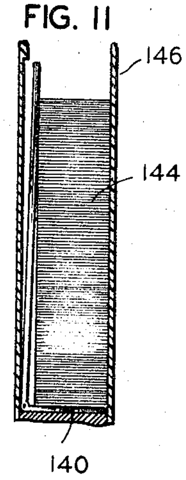
FIG. 11 is a cross-sectional view similar to FIG. 10 but showing tape wound on the reel.

In the embodiment of FIG. 10, an L-shaped guide 130 is shown pivoted at its corner on pin 132. The long arm 134 of the guide 130 is shown in FIG. 10 to be disposed against the inner surface 136 of the tape guide reel flange 138. The foot 140 of the guide 130 is positioned inclined to the winding surface 142. In FIG. 11 tape 144 is shown wound upon the reel. It will be noted in that figure that the foot 140 is pressed firmly against the hub surface 142 by the first turn of the tape, and this movement of the foot causes the long arm 134 to pivot into the position wherein it serves as a guide to cause the tape to wind evenly on the reel. In its biased position shown in FIG. 10, the guide is disposed out of the way and does not interfere with the winding of the first turns of tape manually onto the reel hub. Tension of the tape at its leading end about the hub causes the foot to shift the guide to the operative position of FIG. 11, and thereafter, each turn of tape wound on the hub is positioned in place against the inner surface of the front reel flange 146 by the guide. The long arm should be somewhat flexible to enable it to move aside under the pressure of each tape turn as they slide along the arm into position on the hub.

Figure 12:
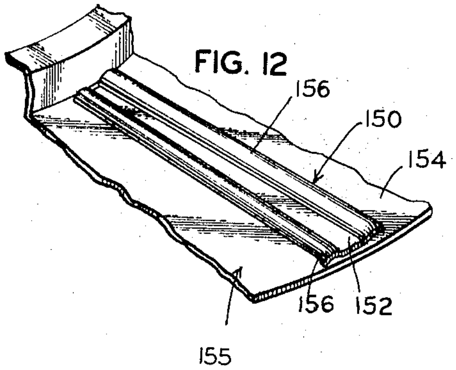
FIG. 12 is a fragmentary perspective view of yet another embodiment of this invention.

The embodiments of FIGS. 12–16 are similar to the preferred embodiment of FIGS. 4.–7 In FIG. 12, the guide 150 is in the form of a resilient metal or plastic strip having two arcuate ribs along its long edges. The central portion 152 of the strip is secured to the inner surface 154 of the guide flange 155 in any convenient manner, and the two arcuate ribs 156 serve as springs and extend away from the surface 154. Their functional configuration is similar to the pillow in the preferred embodiment but the ribs are allowed to flex along their inner edges which join the center of the strip 152. It is evident that when the surfaces of the arcuate ribs 156 are spaced from the opposite flange a few thousandths of an inch less than the width of the tape, the ribs will serve as a guide to insure proper tape winding. Because the ribs are flexible, they will yield to the force of the tape and displace inwardly toward the surface 154 of the reel flange as the turns wind up on the hub. The outer end of the strip may be sloped toward the surface 154 as shown in the drawing to allow the turns of tape to pass smoothly into position.

Figure 13:
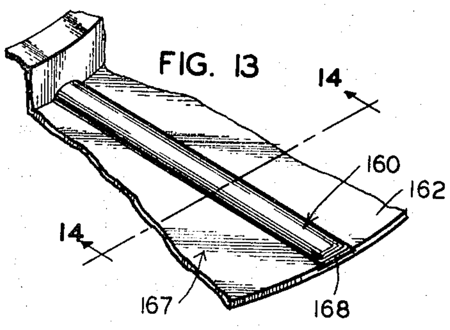
FIG. 13 is a fragmentary cross-sectional view of still another embodiment of this invention.
Figure 14:
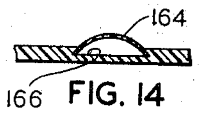
FIG. 14 is a cross-sectional view taken along the section line 14—14 of FIG. 13.

The embodiment of FIGS. 13 and 14 is similar to the preferred embodiment in that a pillow 160 is attached to the inner surface 162 of the reel flange. In FIG. 14 the pillow is shown formed by a strip of thin film 164 having its edges within a dove-tailed slot 166 in the surface 162 of the tape guide flange 167.

The outer end 168 of the pillow may be closed as suggested in FIG. 13 and have a smooth inclined surface so as to guide the tape into position between the two reel flanges and against the front flange (not shown). It is to be understood that the pillow strip 160 just as the strips in the other embodiments defines a gap with the opposite flange a few thousandths of an inch less than the tape width so as to insure proper placement of the tape against the opposite reel flange. Further, the strip should be of flexible material to yield to the edge of the tape when the tape is wound in place. In this embodiment, as in the preferred form of the invention, the strip has longitudinal flexibility so that the portion of the pillow not actually engaged by the tape remains in operative position.

Figure 15:
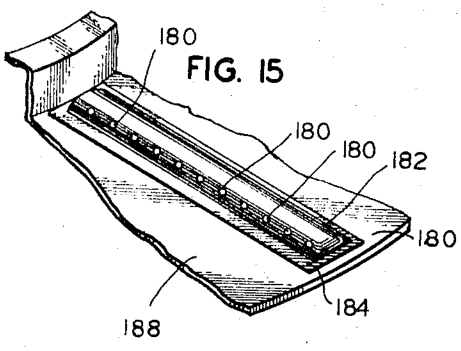
FIG. 15 is a fragmentary perspective view of another embodiment of this invention.

FIG. 15 discloses yet another embodiment of this invention. This embodiment is very similar to the preferred form shown in FIGS. 4–7. It differs only from that embodiment in the placement of the openings to allow a pillow to be air supported. In this embodiment, a series of openings 180 are provided along the leading edge of the pillow strip 182 to allow air to enter beneath the strip to hold it in the operative position shown. It is to be understood that the film material may have sufficient stiffness so as to be self-supporting without the air below. The air cushion may merely add to the resiliency. In other respects this embodiment is the same as the preferred embodiment and is shown to employ a frame 184 disposed in a well (not shown) on the inner surface 186 of the reel flange 188.

Figure 16:
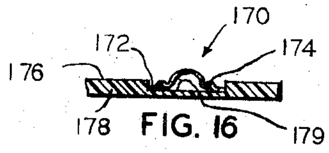
FIG. 16 is a view similar to FIG. 14 but showing yet another embodiment of this invention.

FIG. 16 discloses another embodiment of this invention. In this embodiment the pillow 170 is corrugated at its longitudinal edges 172 and 174, and those edges are in turn secured in a well 179 in the inner face 176 of the tape guide flange 178. The corrugations in the sides of the pillow allow the pillow to flex easily when the tape is wound on the reel between the flanges. The pillow must be able to flex sufficiently so as to permit the tape to wind in place on the reel without the tape edge adjacent the pillow being torn, frayed or otherwise mutilated. Essentially, the pillow in the embodiment of FIG. 16 as in the other embodiments is flexible but in its fully extended position provides a clearance for the tape which is equal to or is a few thousandths of an inch less than the actual tape width. Therefore, it must be allowed to flex or compress somewhat when the tape is wound in place. The pillow material should in all the embodiments have a low coefficient of friction so that the tape slides smoothly over it.

Figure 17:
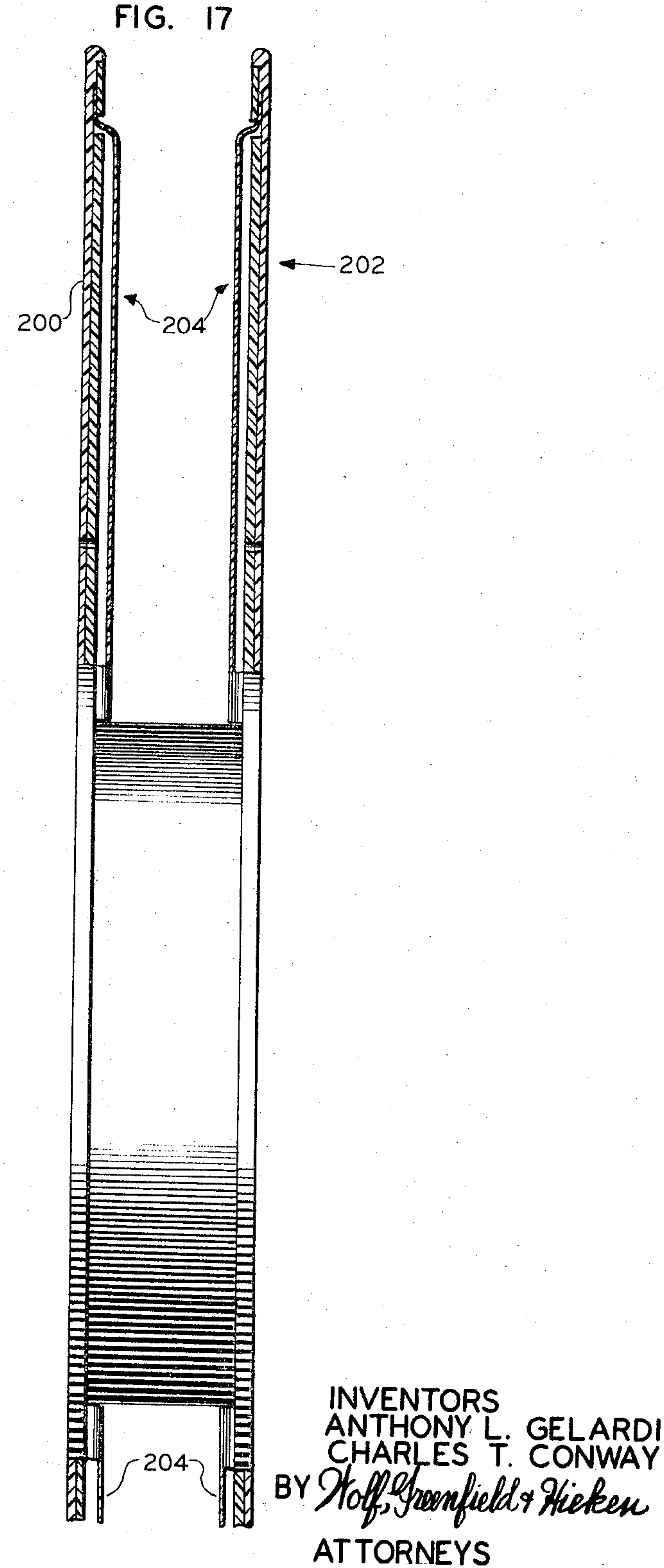
FIGS. 17 is an end view, partly in section, of still another embodiment of this invention.

In each of the embodiments shown, the pillow is intended to cause the tape to wind against the reel flange opposite to that which actually carries the pillow. It is to be understood, however, that pillows may be provided on both reel flanges to cause the tape to wind evenly on the hub spaced from each flange and without blow-outs on either side. This is shown in FIG. 17 wherein the reel includes tape guide assemblies on both the front and rear flanges 200 and 202 to position the tape turns on the hub spaced from the flanges, unlike the arrangement of FIG. 3 wherein the tape turns are against one flange and spaced from the other. In this embodiment, each flange carries a pair of guides 204 identical to the guides in the embodifent of FIGS. 4–7. The guides in the embodiment shown are disposed opposite one another in the two flanges, but it is to be understood that they may be circumferentially displaced. The tape wound on the reel will be spaced equally from each flange, and the guides prevent blow-outs which could be damaged by flexing of either flange.

It should also be evident from the foregoing description that many other configurations are possible for the pillow. For example, the shape of the film may be preserved by filling the space beneath it with a very soft rubber-like material. Such a material must enable the pillow to deflect when the edge of the tape rides across it, but it must either return to or remain in a position that will enable it to guide the tape turns into the proper position.

In several of the embodiments, the guide moves to its operative position in response to some phase of the winding operation. For example, if the pillow is deflatable in the preferred embodiment, then rotation may cause it to inflate. In the embodiment of FIGS. 10 and 11, the pressure of the tape on the arm of the guide causes it to assume the operative condition. In the embodiment of FIG. 8, centrifugal force achieves this result.

It should also be understood that the hub of the tape reel need not be a perfect cylinder. The guides themselves will produce the uniformity desired. Further, it should be understood that the uniformly wound tape is immune from other damage than that caused by the flexture of the flanges. For example, exposed tape edges may be damaged through openings in the reel flanges when the reels are handled by an operator.

Because numerous modifications may be made of this invention without departing from its spirit, it is not intended that the breadth of this invention be limited to the embodiments illustrated and described. Rather, it is intended that the scope of this invention be determined by the appended claims and their equivalents.

What is claimed is:

1. A tape reel comprising:
a hub and a pair of substantially parallel flanges,
at least one guide disposed on the inner surface of one of the flanges for positioning each turn of tape on the reel in a selected position with respect to the flanges,
said guide being movable between operative and inoperative conditions in response to a phase of the winding operation of the tape on the reel.

2. A tape reel as defined in claim 1 further characterized by
the surface of the guide being a distance from the other flange greater than the width of the tape when the guide is in the inoperative condition.

3. A tape reel as defined in claim 1 further characterized by
said winding operation phase being the rotation of the reel.

4. A tape reel as defined in claim 1 further characterized by
said winding operation phase being the winding of the tape on the hub.

5. A tape reel comprising:
a hub and a pair of substantially parallel flanges,
and at least one guide disposed on the inner surface of one of the flanges for positioning each turn of tape on the reel in a selected position with respect to the flanges,
said guide being an inflatable member which when inflated is in its operative condition.

6. A tape reel as defined in claim 5 further characterized by said guide including:
at least one shallow recess in one of the flanges,
a thin strip of flexible material disposed in the recess and having a pillow portion that extends out of the recess toward the opposite reel flange,
the pillow being positioned to engage each turn of tape and guide each to a selected position between said flanges,
said strip having a flange extending about the pillow,
and means secured to the reel flange engaging the strip flange for holding the pillow in position.

7. A tape reel as defined in claim 6 further characterized by
a shoulder in the recess surrounding the strip,
said means being a frame seated on the shoulder,
and means preventing the pillow from inverting in the recess.

8. A tape reel as defined in claim 6 further characterized by
means for introducing air under the strip to urge the pillow into the operative position.

9. A tape reel as defined in claim 7 further characterized by
means urging the strip into the operative condition.

10. A tape reel as defined in claim 1 further characterized by
said guide being pivotally mounted on the reel and moving to the operative position in response to tape wound on the hub of the reel.

References Cited

UNITED STATES PATENTS

| | | | |
|---|---|---|---|
| 1,454,818 | 5/1923 | Jones | 242—71.8 X |
| 1,840,822 | 1/1932 | Ross | 242—71.8 |
| 2,004,608 | 6/1935 | Howell | 242—71.2 |
| 2,973,159 | 2/1961 | Kulka | 242—71.8 |
| 3,208,688 | 9/1965 | Hanes | 242—71.8 |

FRANK J. COHEN, *Primary Examiner.*

N. L. MINTZ, *Assistant Examiner.*